US008683526B2

(12) United States Patent
Ruiz-Velasco et al.

(10) Patent No.: US 8,683,526 B2
(45) Date of Patent: *Mar. 25, 2014

(54) RESOURCE DATA CONFIGURATION FOR MEDIA CONTENT ACCESS SYSTEMS AND METHODS

(75) Inventors: Enrique Ruiz-Velasco, Flower Mound, TX (US); Laxmi Patel, Irving, TX (US); Abhishek Desai, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/218,822

(22) Filed: Aug. 26, 2011

(65) Prior Publication Data

US 2011/0314503 A1  Dec. 22, 2011

Related U.S. Application Data

(63) Continuation of application No. 11/693,267, filed on Mar. 29, 2007, now Pat. No. 8,015,581.

(60) Provisional application No. 60/879,003, filed on Jan. 5, 2007.

(51) Int. Cl.
 *H04N 5/445* (2011.01)
(52) U.S. Cl.
 USPC ........................................... 725/50; 709/219
(58) Field of Classification Search
 USPC ............... 725/37–61, 106–122; 709/217–232
 See application file for complete search history.

(56) References Cited

U.S. PATENT DOCUMENTS

| | | | |
|---|---|---|---|
| 5,710,887 A * | 1/1998 | Chelliah et al. | 705/26.62 |
| 5,758,259 A * | 5/1998 | Lawler | 725/45 |
| 6,005,565 A | 12/1999 | Legall et al. | |
| 6,020,881 A | 2/2000 | Naughton et al. | |
| 6,141,003 A | 10/2000 | Chor et al. | |
| 6,144,376 A | 11/2000 | Connelly | |
| 6,177,931 B1 | 1/2001 | Alexander et al. | |
| 6,240,555 B1 | 5/2001 | Shoff et al. | |
| 6,269,275 B1 | 7/2001 | Slade | |
| 6,492,997 B1 * | 12/2002 | Gerba et al. | 715/721 |
| 7,168,085 B2 | 1/2007 | Baldwin et al. | |
| 7,240,356 B2 | 7/2007 | Iki et al. | |
| 7,540,012 B1 | 5/2009 | Herzberg et al. | |
| 8,015,581 B2 * | 9/2011 | Ruiz-Velasco et al. | 725/50 |

* cited by examiner

*Primary Examiner* — Annan Shang

(57) ABSTRACT

In one of many possible implementations, a system includes a content delivery subsystem providing online resource data and programming data associated with media content. The system further includes a content processing subsystem configured to communicate with the content delivery subsystem via a network. The content processing subsystem is configured to receive the programming data and to generate a program guide user interface including at least a subset of the programming data. The content processing subsystem is configured to access and utilize the online resource data to generate the program guide user interface when the online resource data is accessible via the network. The content processing subsystem is further configured to maintain and utilize offline resource data instead of the online resource data to generate the program guide user interface when the online resource data is inaccessible via the network.

23 Claims, 9 Drawing Sheets

RESOURCE DATA CONFIGURATION FOR MEDIA CONTENT ACCESS SYSTEMS AND METHODS

RELATED APPLICATIONS

This application is a continuation of U.S. patent application Ser. No. 11/693,267 by Enrique Ruiz-Velasco et al., filed on Mar. 29, 2007, and entitled RESOURCE DATA CONFIGURATION FOR MEDIA CONTENT ACCESS SYSTEMS AND METHODS, which claims priority under 35 U.S.C. §119(e) to U.S. Provisional Patent Application No. 60/879,003 by Brian Roberts et al., filed on Jan. 5, 2007, and entitled USER INTERFACE FUNCTIONS FOR MEDIA CONTENT ACCESS SYSTEMS AND METHODS. The contents of both applications are hereby incorporated by reference in their respective entireties.

BACKGROUND INFORMATION

The advent of computers, the Internet, and other advances in the digital realm of consumer electronics have resulted in a great variety of programming, recording, and viewing options for users who view media content such as television programs. In implementing such options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is usually configured to provide users with access to a large number and variety of media content choices provided by a subscriber television system. For example, a user may choose to experience a variety of broadcast television programs, pay-per-view services, video-on-demand programming, and audio programming via an STB.

To assist a user with navigating the variety of media content choices provided by the subscriber television system, an STB typically includes a program guide application, which is configured to present information descriptive of media content to the user. For example, a typical program guide may provide scheduling and/or ordering information related to the media content choices.

However, the capabilities of conventional program guide applications are generally limited because of the inherent limitations of conventional STBs. Typically, traditional STBs are designed to have minimal memory and processing capabilities. While this helps keep consumer costs down, it also restricts the amount of information that can be stored and processed by an STB. The restriction is especially problematic for conventional program guide applications, which rely upon locally stored data to generate program guide user interfaces. Consequently, the quality of traditional program guide user interfaces has been sacrificed.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

DETAILED DESCRIPTION

Figure 1:
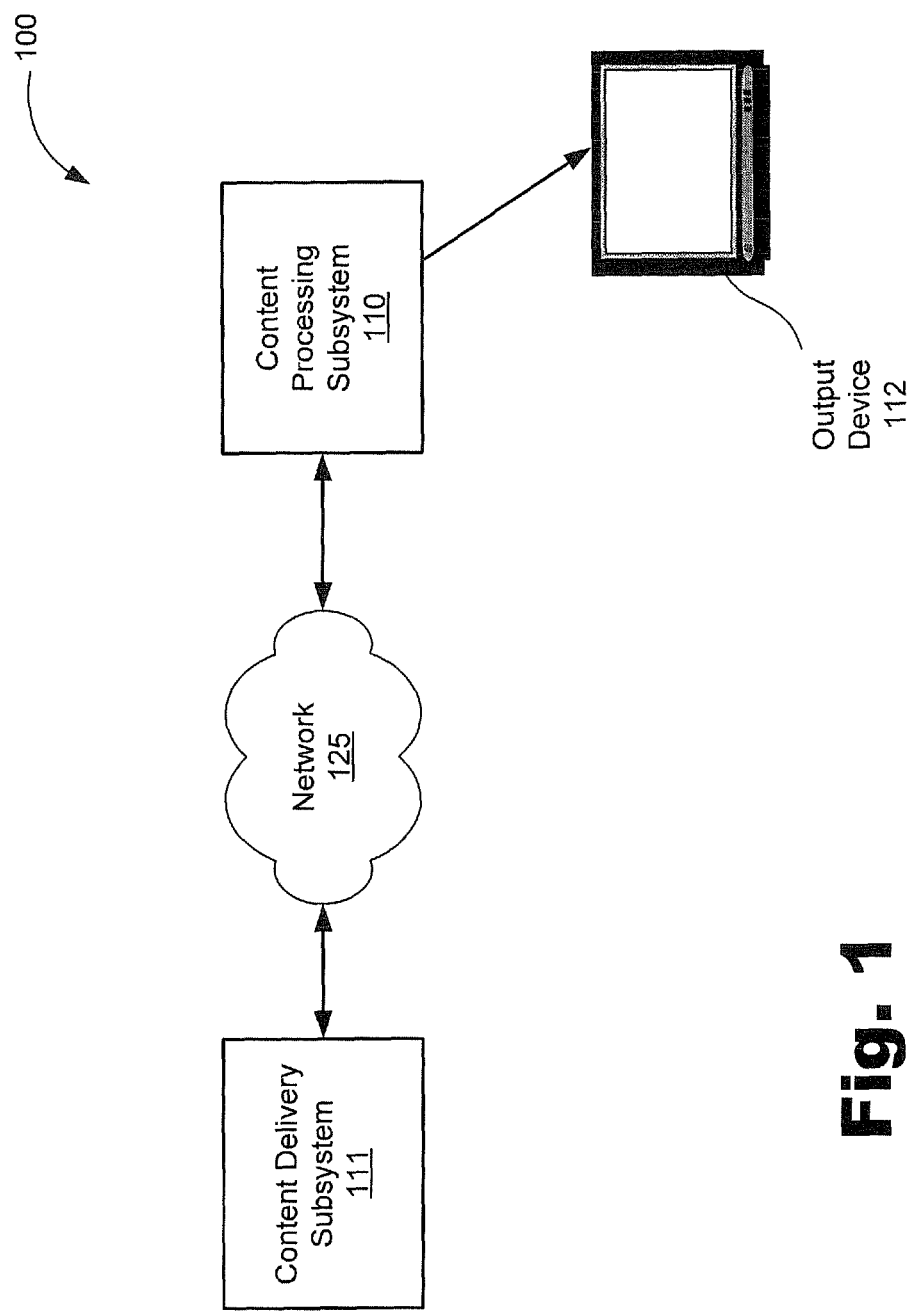
FIG. 1 illustrates an exemplary media content access system.

Exemplary resource data configurations for media content access systems and methods are described herein. The resource data configurations described herein enable content processing subsystems to provide rich, high-quality user interfaces even when memory and processing resources are limited. In certain implementations, a content processing subsystem such as a set-top box ("STB") may be configured to access (e.g., download) online resource data (e.g., configuration files, images, other graphics, etc.) from a content delivery subsystem when the online resource data is accessible. In certain examples, the online resource data may be accessed on demand. Typically, the content processing subsystem is configured to access the online resource data over a network. The content processing subsystem may be configured to access and utilize offline resource data (instead of the online resource data) when a condition related to the online resource data is met. The condition may include, but is not limited to, unavailability of the online resource data for at least a threshold period of time. For example, when the online resource data is inaccessible (e.g., a network connection between the content processing subsystem and the content delivery subsystem is interrupted or has insufficient available bandwidth, or a content delivery subsystem server is unavailable), the content processing subsystem may be configured to utilize offline resource data that is maintained locally by the content processing subsystem.

By way of an example, the content processing subsystem may include an STB configured to receive content including media content and programming data descriptive of the media content from a content delivery subsystem, which may include one or more servers providing the content over a network. The STB may be configured to generate a program guide user interface including the programming data and to provide the program guide user interface for presentation to a user. In generating the program guide user interface when the online resource data is accessed over the network, the STB may be configured to access (e.g., download on demand) online resource data from the content delivery subsystem and to utilize the accessed online resource data for generating the program guide user interface. By accessing the online resource data instead of maintaining a full set of resource data locally, the STB conserves memory resources and can provide a rich, high-quality program guide user interface, even when the STB has limited memory and processing capabilities.

The STB may be configured to maintain a base set of offline resource data and to utilize the offline resource data instead of the online resource data when a condition related to the online resource data is met (e.g., the online resource data is inaccessible over the network). Accordingly, the STB can still generate and provide a program guide user interface even when the online resource data is inaccessible.

In certain implementations, the online resource data supports generation of a first version of the program guide user interface (i.e., an "online mode" program user interface) when online resource data is accessible and a second version of the program guide user interface (e.g., an "offline mode" program guide user interface) when the online resource data is inaccessible. The "offline mode" version of the program guide user interface may be a downgraded version of the "online mode" version of the program guide user interface. For example, when in online mode, an STB may download programming data. The STB may at some point switch from online more to offline mode, and an "offline mode" program guide user interface may include base information (e.g., a least a subset of the downloaded programming data), but omit one or more other features such as certain graphics and/or advanced options that may be normally included in the "online mode" program guide user interface.

The offline resource data may be configured to help conserve the memory and processing resources of the STB. In certain implementations, the offline resource data is included in a data object. The data object may include a set of resource data and an index that enables the STB to conveniently identify the location of any particular resource data instance (e.g., a resource file) included in the data object, without having to parse the entire data object. An exemplary data object structure will be described further below.

A resource data management tool (e.g., a web-based tool) may be provided and may enable an operator of the content delivery subsystem to remotely manage online and/or offline resource data. For example, using the tool, the operator may define, modify, upload, delete, and otherwise manage the resource data, including defining offline resource data by selecting a subset of the online resource data. The content delivery subsystem may be configured to push defined offline resource data over a network to one or more content processing subsystems (e.g., STBs) connected to the network. Exemplary resource data management tools will be described further below.

Turning now to the drawings, FIG. 1 illustrates an exemplary media content access system 100. As shown in FIG. 1, media content access system 100 may include a content processing subsystem 110 and a content delivery subsystem 111 configured to communicate with one another by way of a network 125. Network 125 may include one or more networks, including, but not limited to the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network), an optical fiber network, an Internet Protocol ("IP") based network, any other suitable network, and any combination of these networks. In certain implementations, network 125 includes "fiber-to-the-premises" transmission media, which can provide significant bandwidth and speed capacities for transmission of content between the content delivery subsystem 111 and the content processing subsystem 110. As described below, such capacities can be leveraged to conserve the local resources of the content processing subsystem 110 and to support robust applications running on the content processing subsystem 110.

The content processing subsystem 110 and content delivery subsystem 111 may communicate using any known communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), optical transmission protocols, socket connections, Ethernet, and other suitable communications networks, protocols, and technologies. The content delivery subsystem could also communicate with the content processing subsystem/(s) by unicast/(multicast) User Datagram Protocol ("UDP") to send information including but not limited to configuration, resource, notification, and alert information.

Content processing subsystem 110 may be configured to receive one or more data streams from content delivery subsystem 111. A data stream may carry any content that can be electronically transmitted between the content delivery subsystem 111 and the content processing subsystem 110. As used herein, the term "content" broadly refers to any electronically represented information that can be processed by the content delivery subsystem 111 and/or the content processing subsystem 110, including, but not limited to, media content, programming data descriptive of the media content, and resource data (e.g., resource files).

The content processing subsystem 110 may be configured to process the data stream provided by the content delivery subsystem 111 and to provide a signal to an output device 112 such that the output device 112 may present content included in the data stream. In this manner, the content processing subsystem 110 may cause content to be presented for experiencing by a user of the content processing subsystem 110.

The output device 112 may include one or more devices configured to present (e.g., display, play, or otherwise provide) the content (e.g., media content and/or programming data) for experiencing by a user. The output device 112 may include, but is not limited to, a display (e.g., a display screen), a television, computer monitor, handheld device, speaker, or any other device configured to present content. As is well known, the output device 112 may receive and process output signals from the content processing subsystem 110 such that content of the output signals may be presented for experiencing by the user.

While FIG. 1 illustrates the output device 112 as being a device separate from and communicatively coupled to the content processing subsystem 110, this is exemplary only and not limiting. In other implementations, the output device 112 and the content processing subsystem 110 may be integrated into one physical device. For example, the output device 112 may include a display (e.g., a display screen) integrated in the content processing subsystem 110.

While an exemplary media content access system 100 is shown in FIG. 1, the exemplary components illustrated in FIG. 1 are not intended to be limiting. Additional or alternative components and/or implementations may be used. Media content access system 100 may take many different forms and include multiple and/or alternate components and facilities. For example, FIG. 1 illustrates only a single content processing subsystem 110. However, multiple content processing subsystems 110 may be configured to communicate with the content delivery subsystem 111 over network 125.

Figure 2:
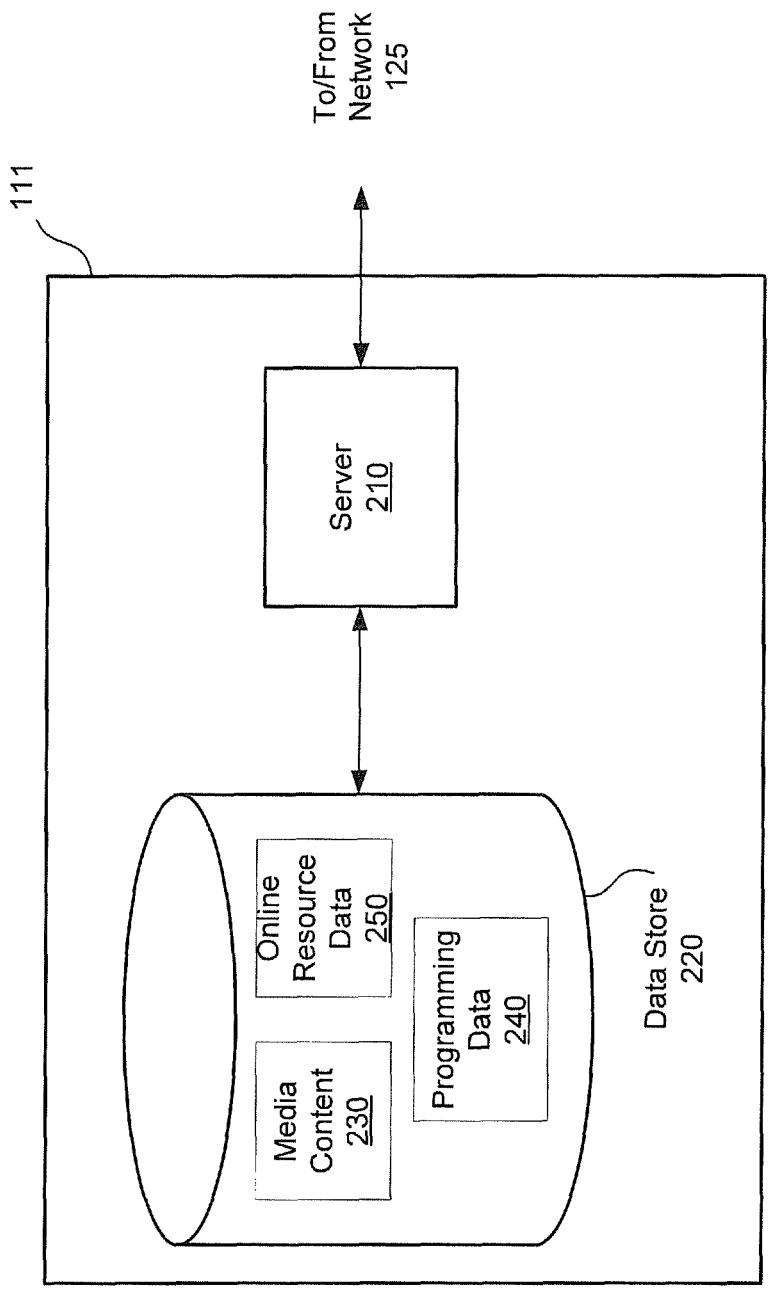
FIG. 2 illustrates an exemplary content delivery subsystem.

FIG. 2 illustrates an exemplary content delivery subsystem 111. As shown in FIG. 2, content delivery subsystem 111 may include a server 210 communicatively coupled to a data store 220. Data store 220 may include one or more data storage mediums, devices, or configurations and may employ any type, form, and combination of storage media, including hard disk drives, read-only memory, caches, databases, optical media, FLASH memory, and random access memory. Data store 220 may include any known technologies useful for storing, updating, modifying, accessing, retrieving, and deleting data.

Server 210 may include one or more devices capable of communicating with content processing subsystem 110 via network 125. In particular, server 210 may be configured to provide content (e.g., data streams carrying content) to the content processing subsystem 110 over the network 125. While FIG. 2 shows one server 210, content processing subsystem 111 may include multiple servers and/or other devices, including various types of servers and/or devices configured to communicate over different types of networks or using different communication technologies. The content delivery subsystem 111 may be implemented at a head-end unit, base station, central office, video hub office ("VHO"), video serving offices ("VSOs"), network node, or other suitable location.

Data store 220 may store content that can be made available over the network 125 by the server 210. In the example shown in FIG. 2, the data store 220 includes media content 230, programming data 240, and online resource data 250. Of course, this is illustrative only. Data store 220 may additionally or alternatively store other content.

Media content 230 may include data representative of media that can be experienced by a user, including, but not limited to, any television program, on-demand program, pay-per-view program, broadcast media program, video-on-demand program, independently-produced media, studio-produced media, video, multimedia, movie, song, photograph, audio programming, or any segment, portion, component, or combination of these or other forms of media that may be presented to and experienced (e.g., viewed) by a user.

Programming data 240 may include any data associated with (e.g., descriptive of) media content, including, but not limited to, data descriptive of media content ordering information, broadcast scheduling information such as scheduled broadcast times and media channels, ratings information, credits, reviews, ratings, and any other information associated with media content.

Online resource data 250 may include any data that can be accessed and utilized by applications running on the content processing subsystem 110, including, but not limited to, configuration files, images, graphics, templates, library files, files containing pre-defined strings/messages, error codes, screen navigation maps, executable code, HTML (or any other markup language) pages, and sound files. By way of an example, the online resource data 250 may include resources (e.g., images) that can be used by a program guide application running on the content processing subsystem 110 to generate a program guide user interface.

Figure 3:
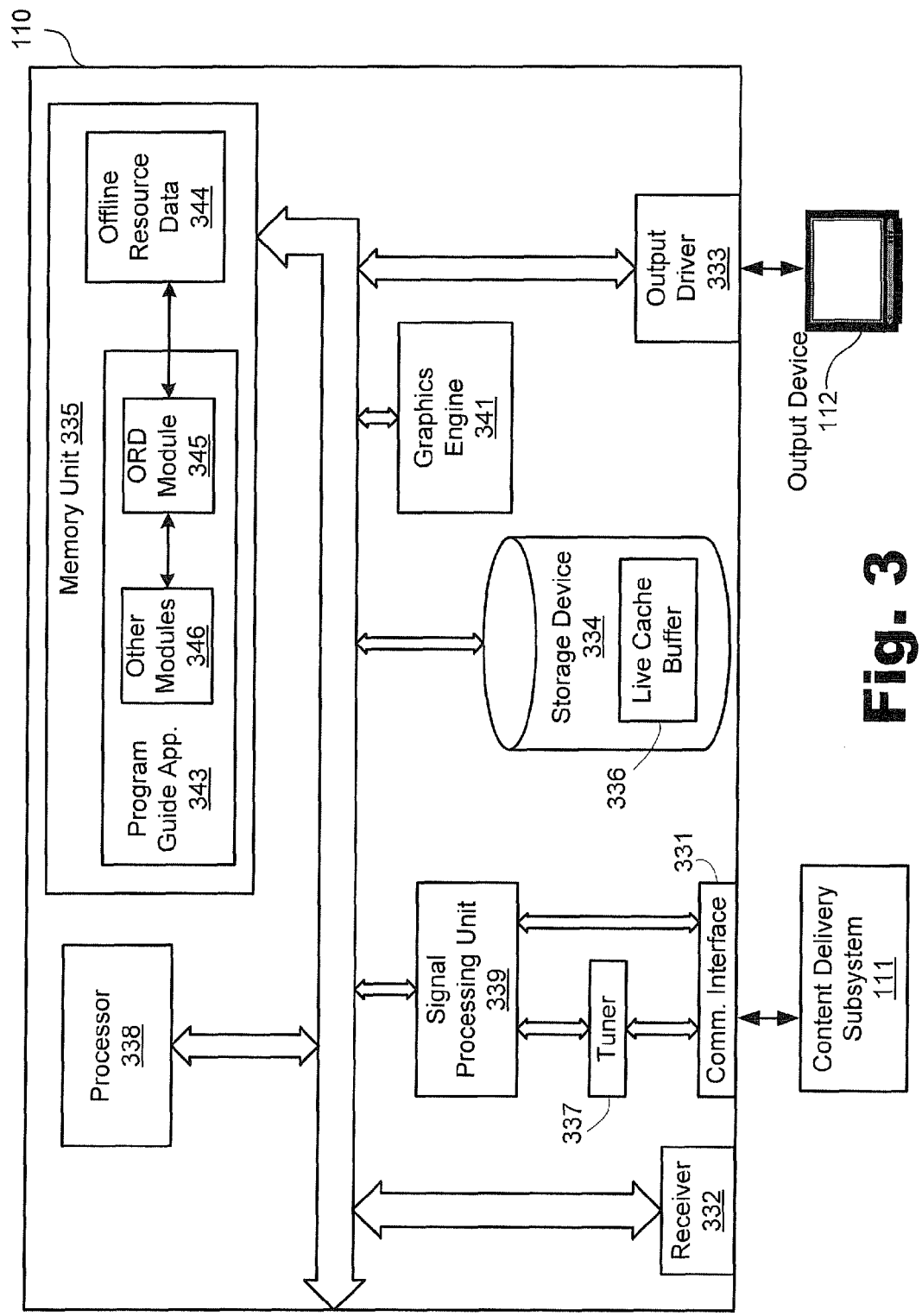
FIG. 3 illustrates an exemplary content processing subsystem.

FIG. 3 is a block diagram of an exemplary content processing subsystem 110 (or simply "processing subsystem 110"). The processing subsystem 110 may include any combination of hardware, software, and firmware configured to process an incoming data stream provided by the content delivery subsystem 111. For example, the processing subsystem 110 may receive a data stream from the content delivery subsystem 111 and process any content included in the data stream, including any media content 230, programming data 240, and online resource data 250 included in the data stream. The processing subsystem 110 may include, but is not limited to, a set-top box ("STB"), home communication terminal ("HCT"), digital home communication terminal ("DHCT"), stand-alone personal video recorder ("PVR"), digital video disc ("DVD") player, video-enabled phone, mobile telephone, and personal computer.

In certain implementations, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

As shown in FIG. 3, the processing subsystem 110 may include a communication interface 331 configured to support communications with the content delivery subsystem 111, including receiving content from the content delivery subsystem 111. The communication interface 331 may include any device, logic, and other technologies suitable for communications with the content delivery subsystem 111, including transmitting signals including requests for data (e.g., online resource data 250) and receiving signals and/or data representative of content. The communication interface 331 can be configured to interface with any suitable communication media, protocols, and formats, including any of those mentioned above.

The processing subsystem 110 may also include a receiver 332 configured to receive input commands from a user input device (not shown). The user input device may include, for example, a remote control, keyboard, game controller, or any other suitable input device (e.g., mobile devices such as personal digital assistants ("PDAs") and mobile phones) that may be configured to communicate with the receiver 332 via a wireless link (e.g., an IR link), electrical connection, or any other suitable communication link.

The processing subsystem 110 may also include an output driver 333 configured to interface with or drive the output device 112, including video and audio devices. The output driver 333 may include any combination of hardware, software, and firmware as may serve a particular application.

Storage device 334 may include one or more data storage media, devices, or configurations and may employ any type, form, and combination of storage media. For example, the storage device 334 may include, but is not limited to, a hard drive, network drive, flash drive, magnetic disc, optical disc, or other non-volatile storage unit. Content (e.g., media content) may be temporarily and/or permanently stored in the storage device 334.

The storage device 334 of FIG. 3 is shown to be a part of the processing subsystem 110 for illustrative purposes only. It will be understood that the storage device 334 may additionally or alternatively be located external to the processing subsystem 110.

The processing subsystem 110 may also include memory unit 335. Memory unit 335 may include, but is not limited to, FLASH memory, random access memory ("RAM"), dynamic RAM ("DRAM"), or a combination thereof. In some examples, as will be described in more detail below, various applications (e.g., a program guide application 343) and data (e.g., offline resource data 344) used by the processing subsystem 110 may reside in memory unit 335.

As shown in FIG. 3, the storage device 334 may include one or more live cache buffers 336. The live cache buffer 336 may additionally or alternatively reside in memory unit 335 or in a storage device external to the processing subsystem 110. The live cache buffer 336 can provide fast access to recently accessed data or content.

Tuner 337 is configured to selectively receive content carried on a particular channel (e.g., television channel), stream, address, frequency or other carrier. For example, tuner 337 may be tuned to a particular media channel such that the content carried on the media channel is received and can be processed by the processing subsystem 110.

In some examples, the processing subsystem 110 may include multiple tuners 337 such that content carried on different media channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 337 is temporarily buffered, or stored, in the live cache buffer 336. If there are multiple tuners 337, there may be a live cache buffer 336 corresponding to each of the tuners 337.

While tuner 337 may be used to receive various types of content-carrying signals broadcast by content delivery subsystem 111, content processing subsystem 110 may be configured to receive other types of content signals (including media content signals) from the content delivery subsystem 111 and/or other source without using a tuner. For example, content delivery subsystem 111 may broadcast digital streams of data packets (e.g., Internet Protocol ("IP") based data packets) that can be received without using a tuner. For such types of content signals, the communication interface 331 may receive and forward the signals directly to the signal processing unit 339 without going through the tuner 337. For an IP-based signal, for example, the signal processing unit 339 may function as an IP receiver or transceiver (e.g., a modem).

As shown in FIG. 3, the processing subsystem 110 may include one or more processors, such as processor 338 configured to control the operations of the processing subsystem 110. The processing subsystem 110 may also include a signal processing unit 339 configured to process incoming content. The signal processing unit 339 may be configured, for example, to demodulate and parse encoded digital media content. In some examples, the processing subsystem 110 may include one or more signal processing units 339 corresponding to each of the tuners 337.

As shown in FIG. 3, the processing subsystem 110 may also include a graphics engine 341 configured to generate graphics that are to be displayed by the output device 112. The graphics may include, but are not limited to, views of media content (e.g., "on-video" screen views), program guides, and other graphics. One or more processors of the processing subsystem 110 (e.g., processor 338 and graphics engine 341) may generate and provide output signals configured to cause the output device 112 to present content included in the output signals. Output signals may be provided to the output device 112 by way of the output driver 333.

One or more applications residing within the processing subsystem 110 may be executed upon initiation by a user of the processing subsystem 110, by the content delivery subsystem 111, or by the occurrence of predefined events. The applications, or application clients, may reside in memory unit 335 or in any other area of the processing subsystem 110 and be executed by one or more processors (e.g., processor 338) of the content processing subsystem 110.

Figure 4:
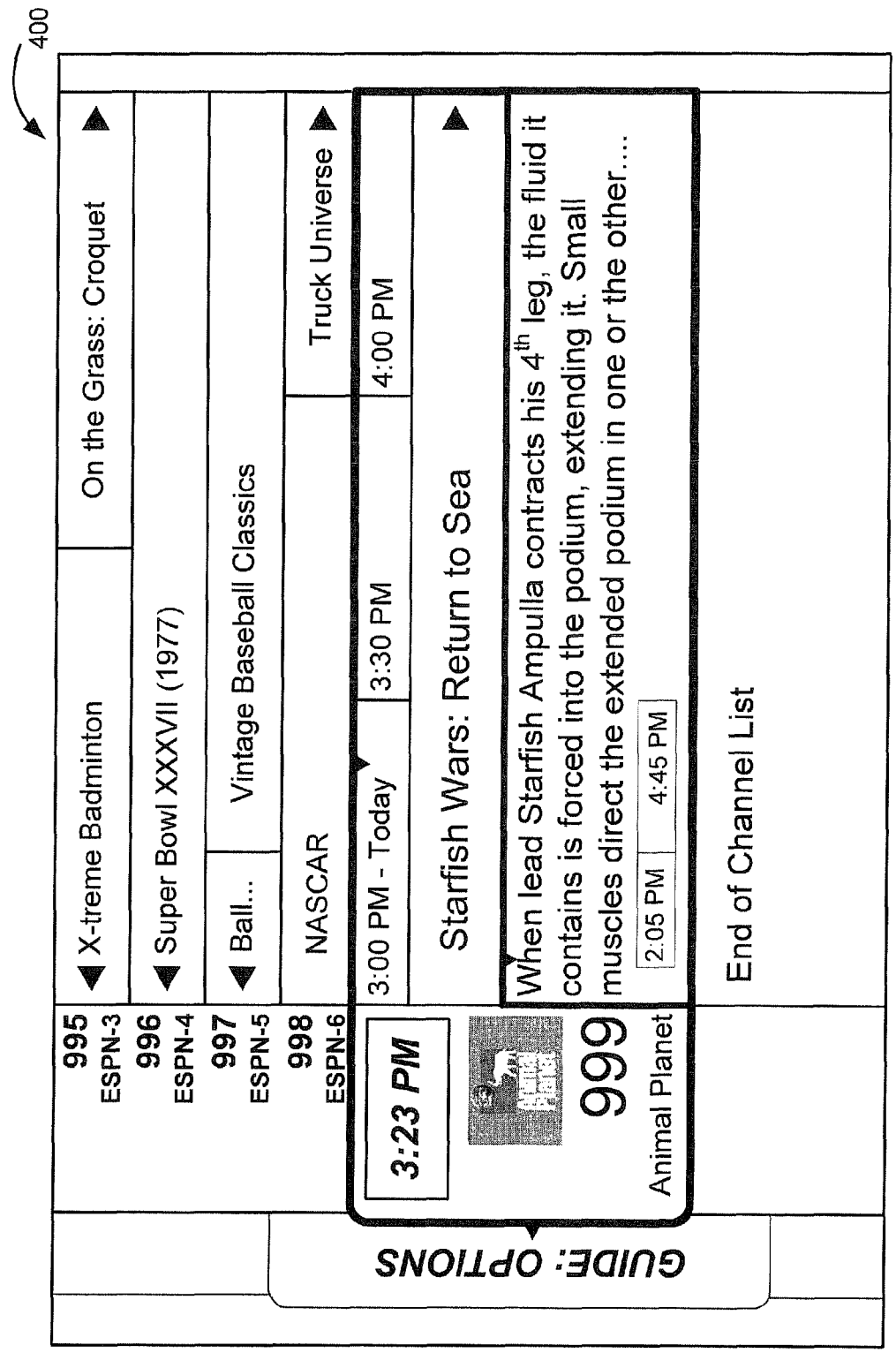
FIG. 4 illustrates an exemplary program guide user interface.

As shown in FIG. 3, one of the applications may be a program guide application 343, which may be configured to generate a program guide user interface that may be provided for presentation by the output device 112. The program guide user interface may include programming data associated with content (e.g., media content) that may be provided to the processing subsystem 110 by the content delivery subsystem 111. For example, the program guide user interface may include descriptions of media content, broadcast scheduling information, content carrier (e.g., channel) information, content ordering information, and any other information that may be helpful to a user in relation to accessing or experiencing content. FIG. 4 illustrates an exemplary program guide user interface 400 that may be generated by the program guide application 343 and displayed by the output device 112.

The program guide user interface 400 may be generated from data stored within the processing subsystem 110 and/or data received from an external source such as the content delivery subsystem 111. For example, in generating the program guide user interface 400, the program guide application 343 may be configured to request and utilize data provided by the content delivery subsystem 111, to utilize locally stored data, or to use a combination of local and requested data, including programming and/or resource data.

The program guide user interface 400 may include programming data 240, which may be retrieved from the content delivery subsystem 111 on demand and/or in advance of the program guide user interface 400 being generated. In certain implementations, for example, programming data 240 is periodically retrieved from the content delivery subsystem 111 and stored locally by the processing subsystem 110. For example, updated programming data 240 may be downloaded on a daily basis. Of course, the processing subsystem 110 may be configured to periodically download programming data 240 more or less frequently, as may suit a particular implementation. A retrieval of programming data 240 from the content delivery subsystem 111 may fetch a predetermined amount of data, such as programming data 240 for one, two, or more days of programming, depending on the particular configuration and memory capabilities of the processing subsystem 110. The amount of programming data, quantified as data representing a predetermined number of days, can be configurable by an operator of the content delivery subsystem.

Whether retrieved on demand or in advance, programming data 240 may be utilized to generate the program guide user interface 400. In certain implementations, the processing subsystem 110 may store retrieved programming data 240 locally and then utilize the locally stored programming data 240 to generate the program guide user interface 400. The locally stored programming data 240 may be periodically updated with up-to-date programming data 240 as described above. Additionally or alternatively, programming data 240 may be retrieved on demand and utilized to generate the program guide user interface 400.

The program guide application 343 may also be configured to utilize resource data such as data included in resource data 250 to generate the program guide user interface 400. For example, the program guide application 343 may utilize templates, configuration files, images, or any other resource data to generate the program guide user interface 400.

In certain implementations, the content processing subsystem 110 may be configured to retrieve (e.g., download) online resource data 250 from the content delivery subsystem 111 for generation of the program guide user interface 400. The online resource data 250 may be retrieved on demand in certain implementations. The processing subsystem 110 may be configured to retrieve online resource data 250 when the online resource data 250 is available from content delivery subsystem 111 over network 125.

The processing subsystem 110 may be configured to determine whether the online resource data 250 is available. The determination may be made in any suitable manner, including sending a test transmission or monitoring parameters of communications between the processing subsystem 110 and the content delivery subsystem 111 and determining whether the parameters satisfy predefined criteria. Examples or predefined criteria may include, but are not limited to, receiving a transmission (e.g., a response to a test transmission) from the content delivery subsystem 111 within a predefined time period, a communication connection having at least a predefined amount of available bandwidth, and any other suitable factor descriptive of communications between the content processing subsystem 110 and the content delivery subsystem 111 over network 125.

Retrieval (e.g., on-demand retrieval) of online resource data 250 may be especially beneficial in implementations in which the content processing subsystem 110 has limited data storage and processing capabilities. For example, the content processing subsystem 110 can conserve memory resources by not maintaining a full set of local resource data. Moreover, the content processing subsystem 110 can provide a rich user interface by retrieving online resource data 250 on demand from the content delivery subsystem 111. A network 125 supporting high transmission speeds and bandwidth, such as a fiber optic network (e.g., a "fiber-to-the-premises" network), can make on-demand retrieval of online resource data 250 an efficient and effective way to manage the demands placed on the content processing subsystem 110 while also providing support for rich, high-quality user interfaces.

When the processing subsystem 110 is retrieving online resource data 250 from the content delivery subsystem 111 as described above, the processing subsystem 110 may be said to be operating in an "online mode." In the "online mode," the processing subsystem 110 can generate rich program guide user interfaces such as the program guide user interface shown in FIG. 4.

For situations in which a condition related to the online resource data (e.g., the online resource data 250 is unavailable from the content delivery subsystem 111 (e.g., server 210 is not responding to communications or there is no suitable connection between the content processing subsystem 110 and the content delivery subsystem 111) for at least a threshold period of time) is met, the content processing subsystem 110 may be configured to operate in an "offline mode." In the "offline mode," the content processing subsystem 110 may utilize offline resource data 344 that is stored locally at the content processing subsystem 110 instead of the online resource data 250 maintained by the content delivery subsystem 111. For example, the program guide application 343 may be configured to utilize the offline resource data 344 to generate a program guide user interface.

Because offline resource data 344 is used instead of online resource data in "offline mode," a program guide user interface generated in "offline mode" may differ from the program guide user interface 400 generated in "online mode." In other words, a first version of a program guide user interface may be generated in "online mode," and a second version of the program guide user interface may be generated in "offline mode." For example, offline resource data 344 may include a base set of resource data (e.g., a base subset of online resource data 250), and an "offline mode" version of a program guide user interface may include a base set of features. For instance, as compared to an "online mode" program user interface such as program guide user interface 400, an "offline mode" program guide user interface may omit one or more features such as particular images or other graphics. Accordingly, a program guide user interface generated in "offline mode" may be a downgraded version of a program guide user interface generated in "online mode."

While an "offline mode" program guide user interface may omit some features, the offline resource data 344 may include sufficient data to support generation of an "offline mode" program guide user interface, which may include base information that may be helpful to a user of the processing subsystem 110. Accordingly, a user of the processing subsystem 110 may continue to have access to a program guide user interface even when online resource data 250 is not available over the network 125.

Returning now to FIG. 3, processing subsystem 110 may include offline resource data 344, which may be stored in memory unit 335 or any other suitable component of processing subsystem 110. Program guide application 343 may be configured to access and utilize the offline resource data 344. For example, the program guide application 343 may include an offline resource data module 345 ("ORD module 345") configured to provide an interface with the offline resource data 344. The ORD module 345 may be configured to access and retrieve data included in the offline resource data 344.

Other modules 346 of the program guide application 343 may communicate with the ORD module 345, including providing identification of any resource data being requested for processing by the other modules 346. The ORD module 345 may locate and access the identified resource data in the offline resource data 344 and provide the identified resource data to the other modules 346 for processing.

The offline resource data 344 may be configured and stored in any suitable manner. For example, the offline resource data 344 may be included in an offline data cache. In certain implementations, the offline resource data 344 is included in a single data object, which may be structured in a manner that can help conserve memory and/or processing resources of the content processing subsystem 110.

Figure 5:
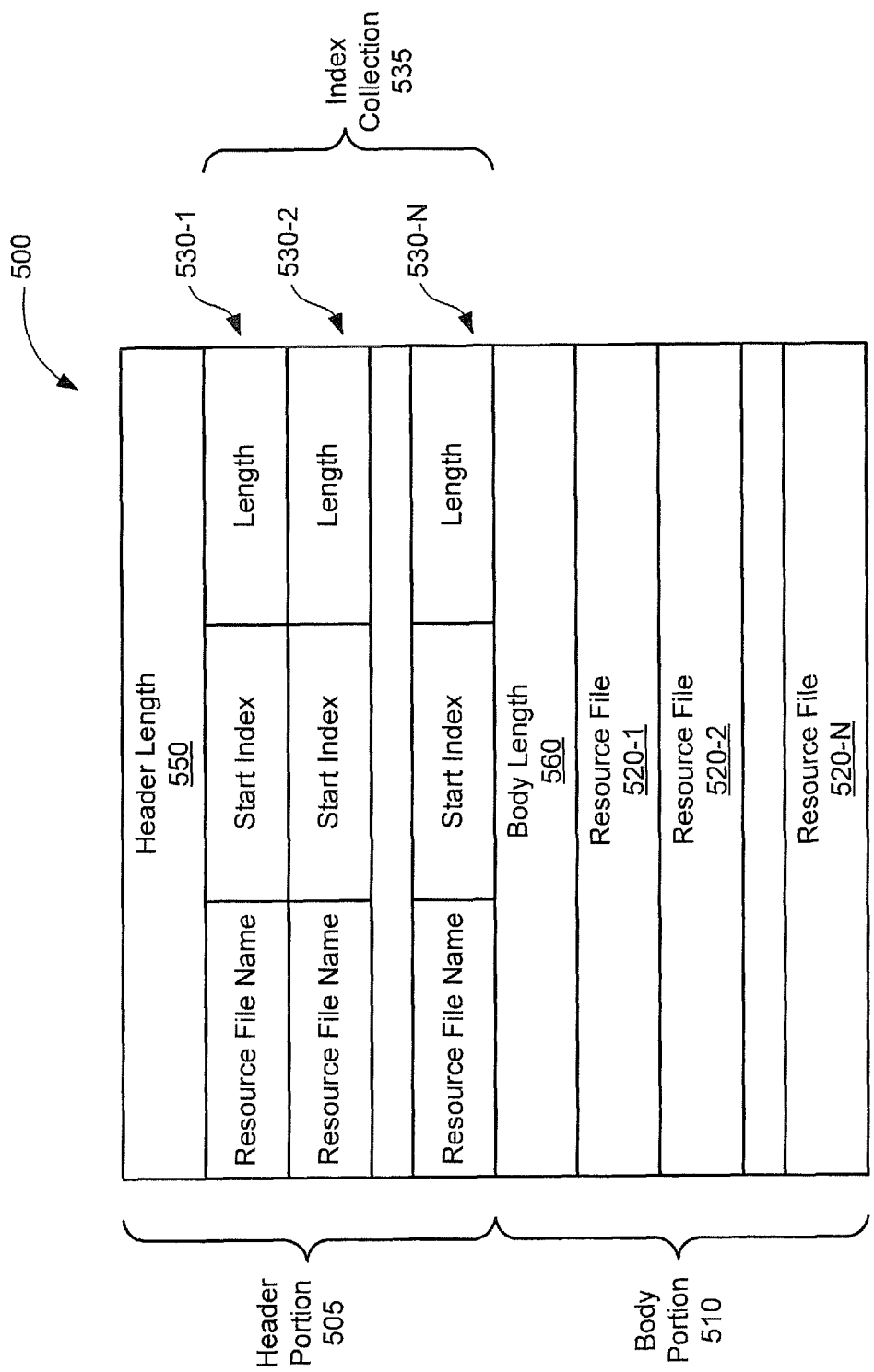
FIG. 5 illustrates an exemplary offline data object structure.

FIG. 5 illustrates an exemplary offline data object structure 500 (or "offline data object 500"). The offline data object 500 may be configured to function as a container for the offline resource data 344. The offline data object 500 may include heterogeneous offline resource data 344, including resource files of different sizes, formats, types, etc. The resource files may be arranged in any order. In certain implementations, the resource files may be read into a byte stream and packed into the offline data object 500 one after another.

As shown in FIG. 5, the offline data object 500 may include a header portion 505 and a body portion 510. The body portion 510 may include one or more resource files. In the example shown in FIG. 5, the body portion 510 includes resource files 520-1 through 520-N (collectively "resource files 520").

Each of the resource files 520 may have a starting position in the data object byte stream. The starting position may be referred to as a "start index." Each resource file 520 may also have an associated file length, which may be referred to as the "file size." The "start index" and the "file size" may be used to determine the position of any corresponding resource file 520 included in the offline data object 500.

As shown in FIG. 5, the header portion 505 may include one or more indices for the resource files 530. In the example shown in FIG. 5, the header portion 505 includes indices 530-1 through 530-N (collectively "indices 530") corresponding to resource files 570-1 through 570-N, respectively. Each of the indices 530 may include a resource file identifier (e.g., a resource file name), a "start index", and a "file size" for the corresponding resource file 520. In some examples, the "start index" and the "file size" in the header portion 505 are each given a two-byte value. The indices 530 may also be referred to as an index collection 535.

The offline data object 500 may also include a header length 550 and a body length 560. The header length 550 may denote the length of the header portion 505, and the body length 560 may denote the length of the body portion 510 of the offline data object 500. In some examples, the header length 550 and the body length 560 are each given a two-byte value. The header length 550 may be used to determine the start position of the body portion 510, and the body length 560 may be used to determine the end position of the body portion 510, which is also the end of the offline data object 500.

The configuration of the offline data object 500 enables any particular resource file 520 to be conveniently located and accessed without having to parse the entire data object 500. This can help minimize the processing resources used to access offline resource data 344. For example, when the ORD module 345 receives an identifier for a particular resource file (e.g., resource file 520-1) being requested by another module 346 of the program guide application 343, the ORD module 345 can search the header portion 505 of the offline data object 500 to find a matching identifier. When the matching identifier is found, the associated index (e.g., index 530-1) and the "start index" and "file size" included therein can be identified. Using this information together with the header length 505, the ORD module 345 can locate the corresponding resource file 520-1, which can then be retrieved and provided to the requesting module 346 of the program guide application 343. In this or similar manner, any resource file 520 included in the offline data object 500 can be conveniently located and accessed without having to parse the entire data object 500.

Figure 6:
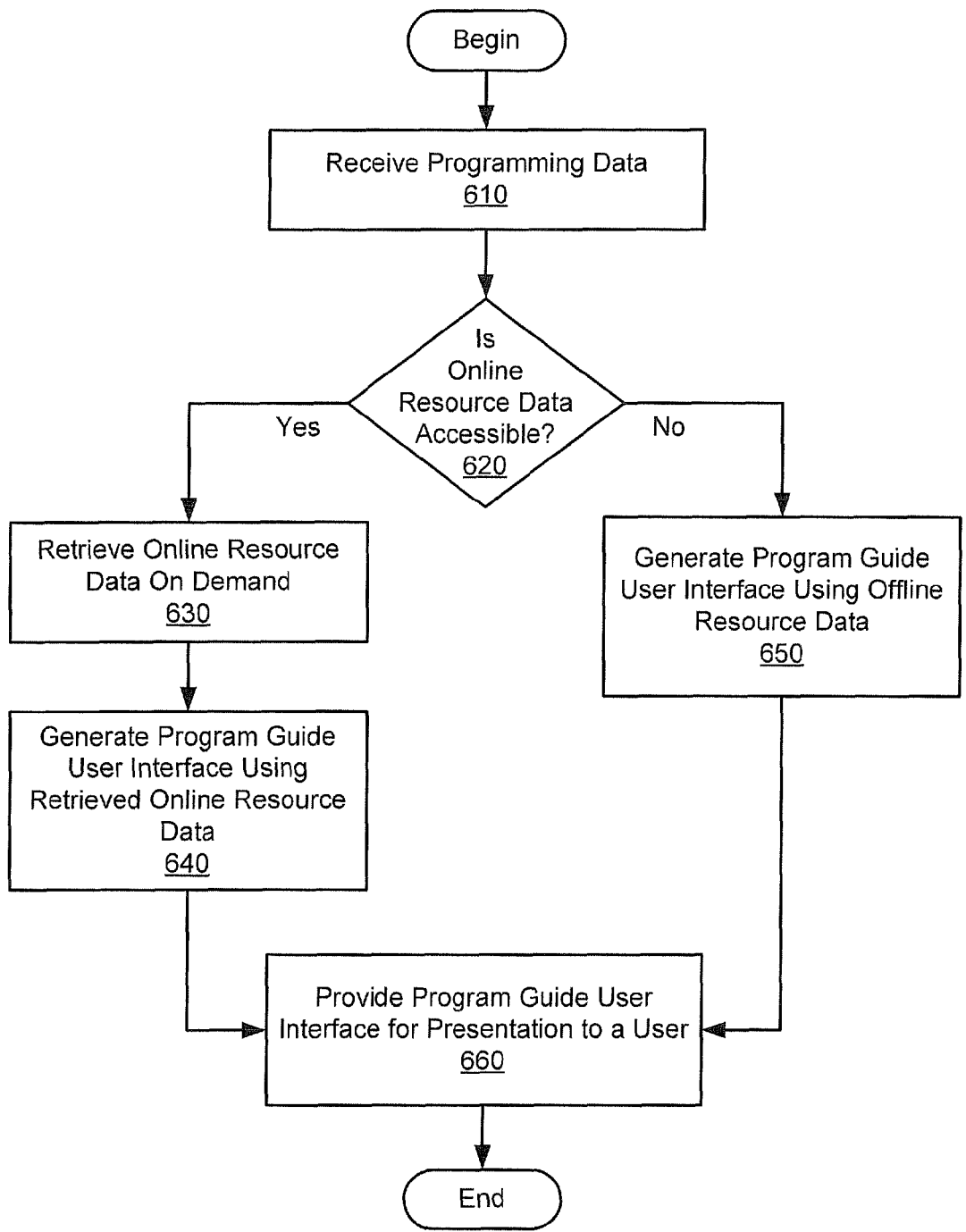
FIG. 6 illustrates an exemplary method of utilizing an exemplary resource data configuration.

FIG. 6 illustrates an exemplary method of utilizing resource data. While FIG. 6 illustrates exemplary steps according to one implementation, other implementations may omit, add to, reorder, and/or modify any of the steps shown in FIG. 6.

In step 610, programming data 240 is received. Step 610 may be performed in any of the ways described above, including the content processing subsystem 110 receiving programming data 240 from the content delivery subsystem 111 on demand, in advance, periodically, or at any other suitable time.

In step 620, it is determined whether online resource data 250 is accessible. Step 620 may be performed in any of the ways described above, including the content processing subsystem 110 determining whether a suitable communication connection is available with the content delivery subsystem 111 and/or whether server 210 is available, for example.

If online resource data 250 is accessible at step 620, processing continues to step 630. In step 630, online resource data 250 is retrieved on demand. Step 630 may be performed in any of the ways described above, including the content processing subsystem 110 downloading online resource data 250 from the content delivery subsystem 111.

In step 640, a program guide user interface is generated using the retrieved online resource data 250. Step 640 may be performed in any of the ways described above, including the content processing subsystem 110 generating the program guide user interface 400 using downloaded online resource data 250, as well as the programming data 240 received in step 610.

In step 660, the generated program guide user interface is provided for presentation to a user. Step 660 may be performed in any of the ways described above, including the content processing subsystem 110 providing one or more output signals carrying data representative of the program guide user interface to the output device 112, which can present the program guide user interface to the user. The process then ends.

On the other hand, if in step 620, it is determined that online resource data 250 is not accessible, processing moves from step 620 to step 650 instead of to step 630 as described above. In step 650, a program guide user interface is generated using offline resource data 344. Step 650 may be performed in any of the ways described above, including the content processing subsystem 110 generating a program guide user interface by accessing and using offline resource data 344 stored in offline data object 500. Processing then moves from step 650 to step 660, which may be performed as described above to provide the generated program guide user interface for presentation to a user.

Figure 7:
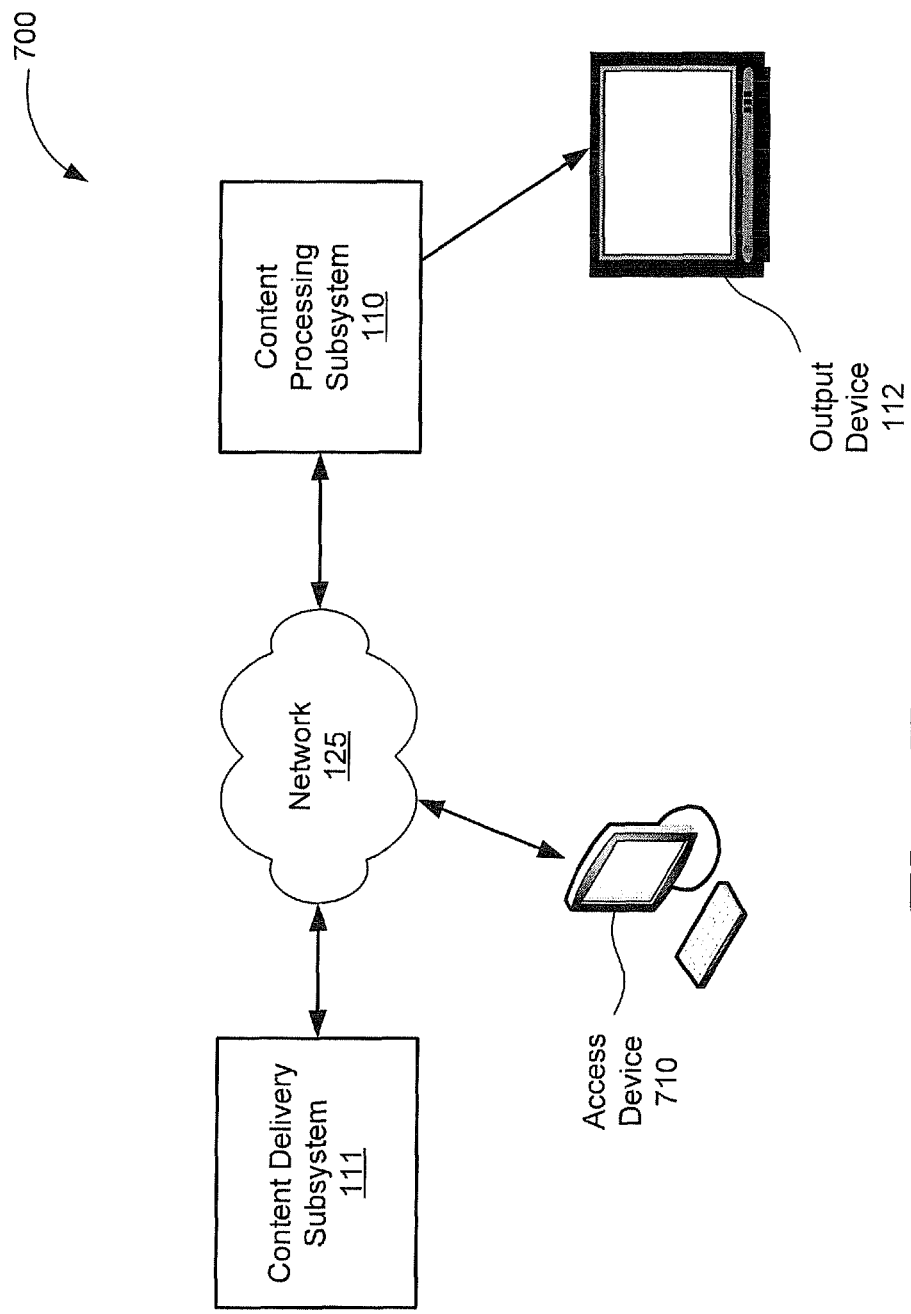
FIG. 7 illustrates another exemplary media content access system.

One or more resource data management tools may be provided and may enable an operator associated with the content delivery subsystem 111 to remotely manage resource data. FIG. 7 illustrates another exemplary media content access system 700 ("system 700"). System 700 may be similar to system 100 except that system 700 includes an access device 710 configured to access at least one resource data management tool provided by the content delivery subsystem 111. The access device 710 may communicate with the content delivery subsystem 111 via network 125. Alternatively, the access device 710 may communicate with the content delivery subsystem 111 via a different network (not shown). In certain implementations, the access device 710 is configured to use the Internet or World Wide Web to communicate with the content delivery subsystem 111.

Access device 710 may include any device physically or remotely accessible to one or more users (e.g., operators of the content delivery subsystem 111) and that allows a user to provide input to and receive output from the content delivery subsystem 111. For example, access device 710 can include, but is not limited to, one or more desktop computers, laptop computers, tablet computers, personal computers, personal data assistants, cellular telephones, satellite pagers, wireless internet devices, embedded computers, video phones, network interface cards, mainframe computers, mini-computers, programmable logic devices, and any other devices capable of communicating with the content delivery subsystem 111. Access device 710 can also include various peripherals such as a terminal, keyboard, mouse, screen, printer, stylus, input device, output device, or any other apparatus that can help provide interact with access device 710.

Access device 710 may include instructions for generating and operating one or more user interfaces. These instructions may be in any computer-readable format, including software, firmware, microcode, and the like. When executed by a processor (not shown) of the access device 710, the instructions may present a user interface to a user.

While FIG. 7 shows a single access device 710, this is only illustrative. One or more access devices 710 may communicate with the content delivery subsystem 111 and gain access to one or more resource data management tools provided by the content delivery subsystem 111.

Content delivery subsystem 111 may be configured to provide at least one resource data management tool to the access device 710. Accordingly, an operator may use the access device 710 to remotely manage resource data, including online resource data 250 and/or offline resource data 344. The content delivery subsystem 111 may be equipped with any suitable security functionality to authenticate the identity and/or permissions of an operator and/or access device 710 before granting access to resource data management tools.

Figure 8:
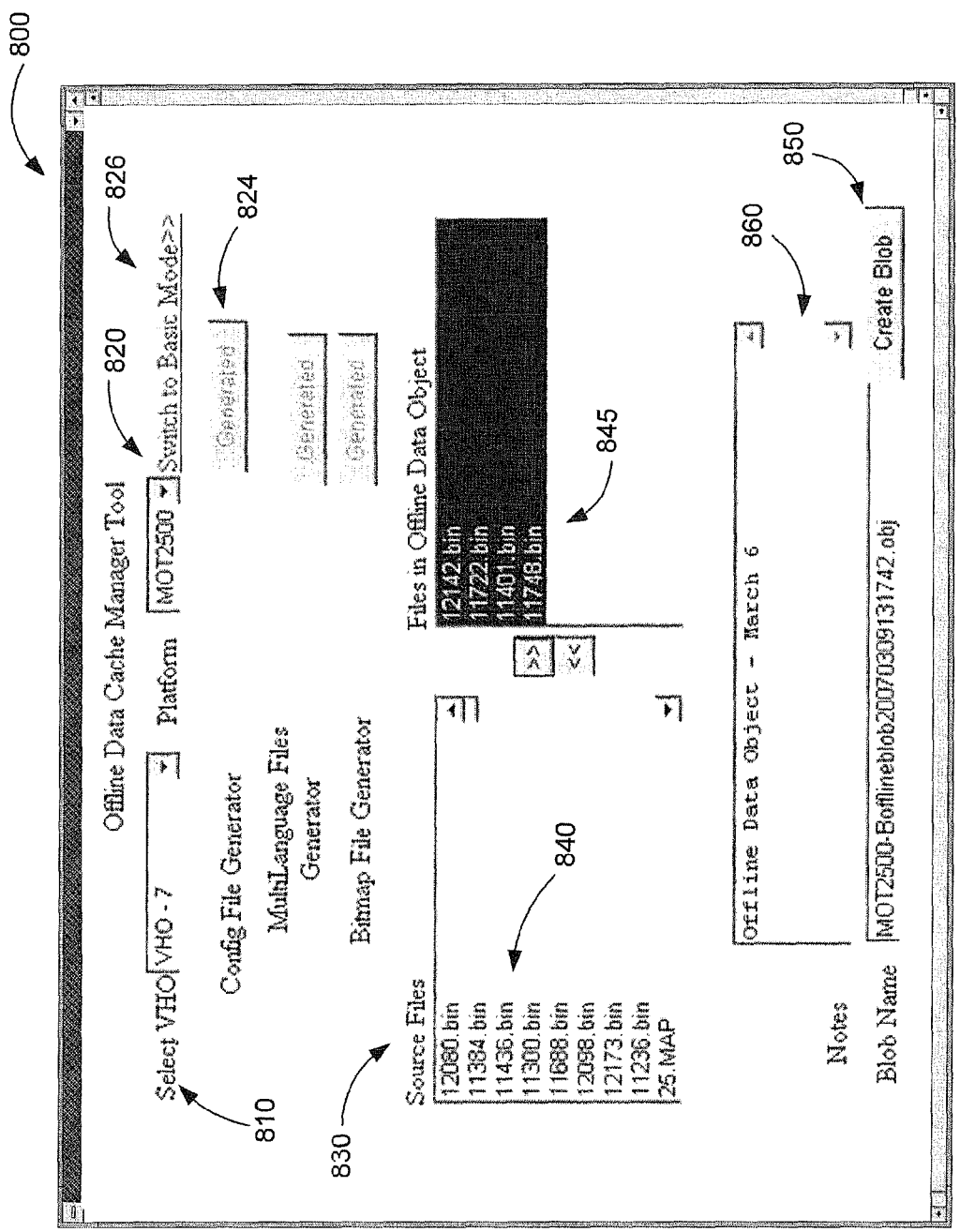
FIG. 8 illustrates an exemplary graphical user interface including exemplary resource data management tools.

FIG. 8 illustrates an exemplary graphical user interface 800 ("GUI 800") including at least one resource data management tool presented therein. As shown in FIG. 8, GUI 800 may include a hub selection tool 810. In the example shown in FIG. 8, the hub selection tool 810 includes a drop down menu enabling an operator to select a video hub from a plurality of video hubs. The video hub options are illustrative only. Other types of hubs (e.g., any media hub) or any sources of content (e.g., servers) may be selectable options in the hub selection tool 810. One of the selectable options included in the hub selection tool 810 may be associated with the content delivery subsystem 111.

As shown in FIG. 8, GUI 800 may also include a platform selection tool 820. In the example shown in FIG. 8, the platform selection tool 820 includes a drop down menu enabling an operator to select a platform from a plurality of platforms. In this particular example, the platforms refer to platforms of various content processing subsystems 110 that may be connected to the network 125. Accordingly, the platform selection tool 820 may enable an operator to select a device type (e.g., a type of STB). This example is illustrative only. Other selectable options may be used in other implementations. For example, the platform selection tool 820 may enable the operator to select from a plurality of platform families. Although not shown in FIG. 8, in other implementations, GUI 800 may include a tool enabling the operator to select a particular content processing subsystem 110 from a plurality of content processing subsystems 110 connected to network 125.

The GUI 800 may be configured to provide management tools for basic and/or advanced management functionality. For example, in a "basic mode," GUI 800 may enable an operator to select a hub (or other data source) and a platform using tools 810 and 820, respectively. The operator may then actuate a generate tool 824 to initiate generation of an offline data object for the selected hub and platform. In this mode, predefined default resource files for the selected hub and platform may be included in the generated offline data object. As shown in FIG. 8, GUI 800 may provide "advanced mode" options and may include a link 826 to a "basic mode" graphical user interface.

In an "advanced mode," GUI 800 may also include a resource data selection tool 830 enabling an operator to manually select resource data to be included as offline resource data 344 in a data object such as data object 500. In the example shown in FIG. 8, the resource data selection tool 830 is configured to enable the operator to select one or more resource data files from a plurality of source files 840. The source files 840 may correspond with any of the online resource data 250 and/or any exclusive offline resource data included in data store 220 of the content delivery subsystem 111. The source files 840 in GUI 800 may be included in the list based on their associations with the selected hub and platform. In certain implementations, the online resource data 250 and/or or other data such as resource data designed for offline use may be filtered based on the selected video hub and platform type, and the result may be included in a list of selectable source files 840.

When the operator selects resource files from the list of source files 840, the GUI 800 may provide any suitable indication of which files have been selected. For example, identifiers for the selected resource files may be displayed in a separate list of selected files 845. The selected resource files may define a base set of offline resource data that can be provided (e.g., downloaded) to the content processing subsystem 110.

With resource files selected manually in the "advanced mode," the operator may initiate a generation of a data object including the selected resource data. The operator may provide an identifier (e.g., "blob name" in GUI 800) for the data object and may initiate a process (e.g., by actuating a "create blob" mechanism 850) that creates the data object such that the data object includes the selected resource files. The data object may be generated as described above. The GUI 800 may also include a note area 860 enabling the operator to provide comments related to the data object.

The generated data object may be stored by the content delivery subsystem 111. Once the data object has been created and stored, a download tool (not shown) may be activated and may enable the operator to make the created data object available to the identified content processing subsystem(s) 110. In certain implementations, the operator may actuate the download tool, and the content delivery subsystem 111 may recognize the command and push the data object over the network 125 (or another network) to the identified content processing subsystem(s) 110. Alternatively, the data object may be made available for retrieval by one or more content processing subsystems 110 over the network 125. In this case, the content delivery subsystem 111 may be configured to wait for a predefined event such as receipt of a predefined signal from a content processing subsystem 110 before transmitting the data object to the content processing subsystem 110.

With the tools included in GUI 800, an operator is able to remotely access the content delivery subsystem 111 and to manage resource data, including creating, modifying, or deleting data objects containing offline resource data. Using the resource data selection tool 830, for example, the operator can create a data object including a base set of offline resource data that can be received and utilized by the content processing subsystem 110 in an "offline mode," as described above. The resource data management tools included in GUI 800 can provide an operator with significant flexibility in managing resource data.

Figure 9:
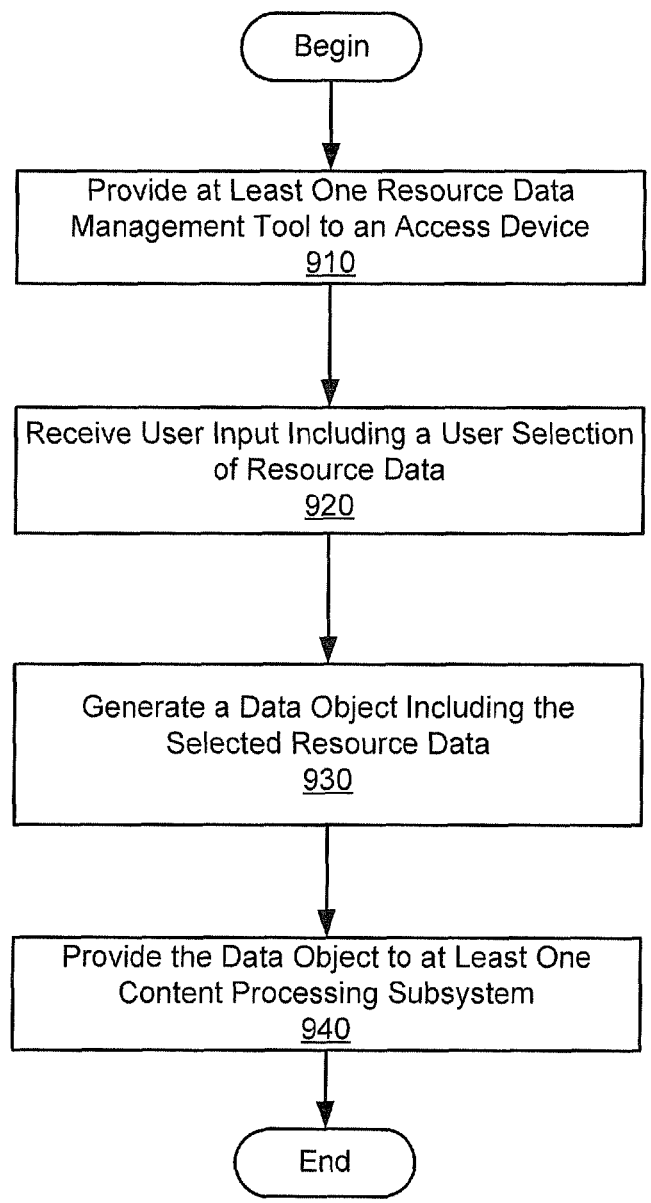
FIG. 9 illustrates an exemplary method of providing for remote management of resource data.

FIG. 9 illustrates an exemplary method of remote management of resource data. While FIG. 9 illustrates exemplary steps according to one implementation, other implementations may omit, add to, reorder, and/or modify any of the steps shown in FIG. 9.

In step 910, at least one resource data management tool is provided to an access device 710. Step 910 may be performed in any of the ways described above, including the content delivery subsystem 111 or another source providing GUI 800 having one or more resource data management tools to the access device 710.

In step 920, user input is received. The user input includes a user selection of resource data. Step 920 may be performed in any of the ways described above, including an operator of the content delivery subsystem 111 using the access device 710 to provide input by way of GUI 800, including a selection of resource data.

In step 930, a data object is generated and includes the selected resource data. Step 930 may be performed in any of the ways described above. For example, the content delivery subsystem 111 may generate the data object in accordance with or similar to the data object structure 500 described above.

In step 940, the data object is provided to at least one content processing subsystem 110. Step 940 may be performed in any of the ways described above, including the content delivery subsystem 111 transmitting the data object to the content processing subsystem 110 over network 125. The data object may be provided in response to any predefined event, which may include, but is not limited to, a command received from an operator via the access device 710, a request from the content processing subsystem 110 (e.g., a download request), and an occurrence of a schedule transmission time.

The preceding description has been presented only to illustrate and describe exemplary implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A system comprising:
   a content delivery subsystem providing online resource data and programming data associated with media content; and
   a content processing subsystem configured to communicate with the content delivery subsystem via a network, the content processing subsystem being configured to receive the programming data associated with the media content, and generate a program guide user interface including at least a subset of the programming data, wherein:
   the content processing subsystem is configured to determine whether the online resource data is accessible via the network,
   the content processing subsystem is configured to access and utilize the online resource data to generate the program guide user interface when the content processing subsystem determines that the online resource data is accessible via the network, and
   the content processing subsystem includes offline resource data and is configured to utilize at least a subset of the offline resource data instead of the online resource data to generate the program guide user interface when the content processing subsystem determines that the online resource data is inaccessible via the network.

2. The system of claim 1, wherein the determining that the online resource data is inaccessible via the network further comprises determining that the online resource data is inaccessible via the network for at least a threshold period of time.

3. The system of claim 1, wherein the content processing subsystem is configured to provide the program guide user interface to an output device for presentation to a user.

4. The system of claim 1, wherein the content processing subsystem is configured to generate a first version of the program guide user interface when the online resource data is accessible via the network and a second version of the program guide user interface when the online resource data is inaccessible via the network.

5. The system of claim 4, wherein the second version of the program guide user interface is a downgraded version of the first version of the program guide user interface.

6. The system of claim 5, wherein the second version of the program guide user interface omits at least one feature included in the first version of the program guide user interface.

7. The system of claim 1, wherein the content processing subsystem includes a data object, the offline resource data being included in the data object.

8. The system of claim 7, wherein the resource data includes at least one resource file, the data object including the at least one resource file and an index indicative of at least one location of the at least one resource file in the data object.

9. The system of claim 8, wherein the data object includes a header portion and a body portion, the index being included in the header portion and the at least one resource file being included in the body portion.

10. The system of claim 1, wherein the content delivery subsystem is configured to provide at least one resource data management tool configured to enable an operator to remotely manage at least one of the online resource data and the offline resource data.

11. The system of claim 10, wherein the at least one resource data management tool is configured to enable the operator to select a subset of the online resource data, the content delivery subsystem being configured to provide the selected subset of the online resource data to the content processing subsystem as the offline resource data.

12. The system of claim 1, wherein the online resource data includes at least one of a configuration file and an image file.

13. The system of claim 1, wherein the content processing subsystem includes a set-top box.

14. An apparatus, comprising:
   a communication interface configured to receive media content, programming data associated with the media content, and resource data from a content delivery subsystem via a network;

at least one processor; and a memory unit including a program guide application, the program guide application configured to direct the at least one processor to generate a program guide user interface including at least a subset of the programming data, wherein the program guide application is configured to direct the at least one processor to:

determine whether online resource data is accessible via the network, access and utilize the online resource data on demand to generate the program guide user interface when the at least one processor determines that the online resource data is accessible via the network, and utilize offline resource data included in the memory unit, instead of the online resource data, to generate the program guide user interface when the at least one processor determines that the online resource data is inaccessible via the network.

15. The apparatus of claim 14, wherein the program guide application is configured to direct the at least one processor to generate a first version of the program guide user interface when the online resource data is accessible and a second version of the program guide user interface when the online resource data is inaccessible.

16. The apparatus of claim 15, wherein the second version of the program guide user interface is a downgraded version of the first version of the program guide user interface.

17. The apparatus of claim 14, wherein the offline resource data includes at least one resource file, and the memory unit includes a data object, the data object including the at least one resource file and an index indicative of at least one location of the at least one resource file in the data object.

18. The apparatus of claim 17, wherein the data object includes a header portion and a body portion, the index being included in the header portion and the at least one resource file being included in the body portion.

19. A method comprising:

maintaining offline resource data; and generating a program guide user interface including programming data associated with media content, wherein the generating includes:

determining whether online resource data is accessible from an external source, accessing and utilizing the online resource data to generate the program guide user interface when the online resource data is determined to be accessible from the external source, and utilizing at least a subset of the offline resource data instead of the online resource data to generate the program guide user interface when the online resource data is determined to be inaccessible from the external source.

20. The method of claim 19, wherein the external source comprises a content delivery subsystem.

21. The method of claim 19, further comprising providing the program guide user interface to an output device for presentation to a user.

22. The method of claim 19, further comprising:

providing at least one resource data management tool to an access device;

receiving user input via the access device, the user input including a user selection of a subset of the online resource data; and defining the offline resource data based on the selected subset of the online resource data.

23. The method of claim 22, further comprising:

generating a data object, the data object including the selected subset of online resource data; and providing the data object to at least one content processing subsystem.

\* \* \* \* \*